United States Patent [19]
Hoffman

[11] Patent Number: 5,483,733
[45] Date of Patent: Jan. 16, 1996

[54] METHOD OF MAKING AN ANGLE GEAR DRIVE

[75] Inventor: Ronald J. Hoffman, Phoeniz, Ariz.

[73] Assignee: Ryobi Outdoor Products Inc., Chandler, Ariz.

[21] Appl. No.: 306,007

[22] Filed: Sep. 14, 1994

Related U.S. Application Data

[62] Division of Ser. No. 21,057, Feb. 23, 1993, Pat. No. 5,363,723.

[51] Int. Cl.⁶ .............................. B21D 39/00; F16H 1/12
[52] U.S. Cl. .............................. 29/463; 29/469; 29/527.5; 29/893.1; 74/417; 30/276
[58] Field of Search .............................. 29/469, 463, 893.1, 29/893.2, 527.5, 33 C; 30/276; 74/416, 417

[56] References Cited

U.S. PATENT DOCUMENTS

| | | | |
|---|---|---|---|
| 3,703,769 | 11/1972 | Pfeiffer | 29/893.1 X |
| 3,781,991 | 1/1974 | Stretton et al. | 30/276 |
| 4,321,838 | 3/1982 | Feldman | 74/417 |
| 4,364,435 | 12/1982 | Tuggle | 172/15 |
| 4,463,544 | 8/1984 | Carsello et al. | 56/17.1 |
| 4,480,493 | 11/1984 | Takahashi | 74/467 |
| 4,507,865 | 4/1985 | Inaga et al. | 29/463 X |
| 4,569,134 | 2/1986 | Kobayashi | 30/347 |
| 4,590,820 | 5/1986 | Hamric | 74/640 |
| 4,628,754 | 12/1986 | Ideta et al. | 74/467 |
| 4,696,201 | 9/1987 | Hattori et al. | 74/467 |
| 4,707,919 | 11/1987 | Tsuchiya | 30/276 |
| 4,811,552 | 3/1989 | Fujimoto | 56/11.8 |
| 4,860,451 | 8/1989 | Pilatowicz et al. | 30/376 |
| 4,930,367 | 6/1990 | Nagasawa | 74/416 |
| 4,936,886 | 6/1990 | Quillen | 56/16.7 |
| 5,103,561 | 4/1992 | Harada et al. | 30/276 |
| 5,363,723 | 11/1994 | Hoffman | 74/416 X |

*Primary Examiner*—Peter Vo
*Assistant Examiner*—Khan V. Nguyen
*Attorney, Agent, or Firm*—Brooks & Kushman

[57] ABSTRACT

An angle gear drive for a portable lawn care implement including first and second housing portions molded to net shape. First and second housing portions support an input shaft having a bevel gear and an output shaft having a mating bevel gear. The assembled housing portions include annular ribs for locating and restraining the input and output shafts so that the bevel gears are securely enclosed in a sealed gear cavity. The gear cavity is sealed by an anaerobic sealant. Grease is supplied to the sealed gear cavity through an axial lubrication bore formed in the input shaft along the axis of the input shaft. The method of making an angle gear drive is also disclosed.

5 Claims, 2 Drawing Sheets

METHOD OF MAKING AN ANGLE GEAR DRIVE

This is a divisional of application Ser. No. 08/021,057, filed on Feb. 23, 1993, is U.S. Pat. No. 5,363,723.

TECHNICAL FIELD

The present invention relates to an angle gear drive for portable lawn care implements. The present invention also relates to an improved method for making an angle gear drive for line trimmers and the like.

BRIEF DESCRIPTION OF THE BACKGROUND ART

Portable lawn care implements having an elongated boom and an internal combustion engine or electric motor at the user's end of the boom require an angle gear drive for transferring rotary movement of an input shaft to the output shaft. The output shaft drives a cutting tool or work engaging member, such as a line trimmer, pruning blade, edger or cultivator which is normally rotated about an axis obliquely angled relative to the axis of the elongated boom. To assure customer satisfaction, angled gear drives should be ruggedly designed for durability. Angled gear drives are a significant cost item in the manufacture of portable lawn care implements.

One example of a gear box for a grass trimmer is disclosed in U.S. Pat. No. 4,507,865 to Inaga et al. Each half of the gear box housing is shaped from stamped steel sheet. The halves are locked together by folding back flanges which are formed on the two gear box halves. Input and output gears are fixed to shafts and meshed within the gear box. Screws retain the gears in the gear box. A grease cup is provided on one side of the gear box.

Another example of a grass trimmer gear case is disclosed in U.S. Pat. No. 5,103,561 to Harada et al. In this design, bevel gears of an input shaft engage an output shaft through sealless ball bearings which are axially press fitted and retained in the gear case by on-shaft retainer rings. The retainer rings are fitted in annular grooves formed on the respective input and output shafts. The gear case is understood to be a one piece gear case.

SUMMARY OF THE INVENTION

It is an object of the invention to provide an angle gear drive for portable lawn care implements having a gear box made from a pair of net-shape cast housing portions which are easy to assemble and which require no machining.

It is another object of the invention to provide an angle gear drive having a pair of housing portions sealingly assembled to each other to define a sealed gear cavity into which lubricating grease is injected after assembly.

Yet another object is to provide a method of making an angle gear drive wherein one half of a housing is shaped to receive gear drive components and a second half of the housing is fitted to the first half to enclose the assembled gearing elements and is adapted for supplying grease to the sealed gear cavity formed by the housing and gearing elements.

Accordingly, an angle gear drive gear box is formed by casting the housing portions to net shape. No additional machining is required to finish the housing portions. An input shaft supporting a bevel gear and, at least one but preferably two, sealed bearings is assembled as a sub-assembly. The sub-assembly is then assembled to one of the housing portions. An output shaft supporting a bevel gear and at least one but preferably two sealed bearings is assembled as a second sub-assembly which is then assembled to the same housing portion. The other housing portion is then assembled to the first housing portion with sealing means, preferably an anaerobic sealing compound, to form a sealed gear cavity which encloses the bevel gears of the input and output shafts. Grease is then supplied, preferably through an axial hole in the input shaft, to the sealed gear cavity.

According to another aspect of the invention, an angle gear drive for a portable lawn care implement comprises a pair of housing portions which support an input shaft having an input bevel gear and an output shaft having an output bevel gear. The input and output shafts each have at least one sealed bearing. The input and output bevel gears mesh in a driving relationship. Sealing means disposed between the housing portions, together with the housing portions themselves and the sealed bearings, form a sealed gear cavity in which the bevel gears are enclosed. Additionally, grease is supplied to the sealed gear cavity through an axial bore formed in the input shaft.

According to the method of the invention, an angled gear drive for a portable lawn care implement is made by net-shaped casting first and second housing portions to net-shape. An input shaft assembly having an input bevel gear and at least one sealed bearing is assembled to one of the housing portions, and an output shaft supporting an output gear and at least one sealed bearing is assembled to the same housing portion with the input and output gears meshing in a driving relationship. Sealing means is provided between the housing portions. The second housing portion is assembled to the first housing portion after the input and output shafts are assembled thereto. The two housing portions are then fastened together to form a sealed gear cavity. Assembly is completed by supplying grease to the sealed gear cavity. These and other objects, features and advantages of the invention will be apparent to one of ordinary skill in the art in view of the attached drawings in light of the following detailed description of the invention.

DETAILED DESCRIPTION OF THE PREFERRED EMBODIMENT

Figure 1:
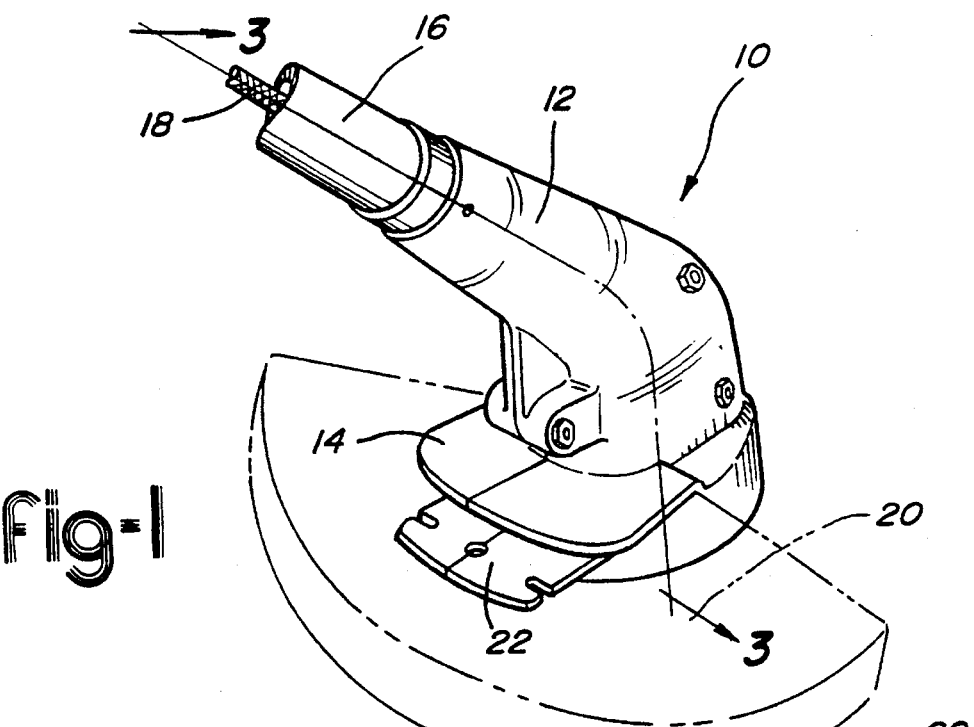
FIG. 1 is a perspective view of an angle gear drive for a portable line trimmer made in accordance with the present invention.

Referring now to FIG. 1, an angle drive 10 is shown. First housing portion 12 and second housing portion 14 are shown assembled together with the angle drive 10 secured to an elongated boom 16. A drive shaft 18 is shown extending through the boom 16. Also illustrated in FIG. 1 is a shield 20 for a line trimmer, shown by phantom lines. The shield is supported by a flange 22.

Figure 2:
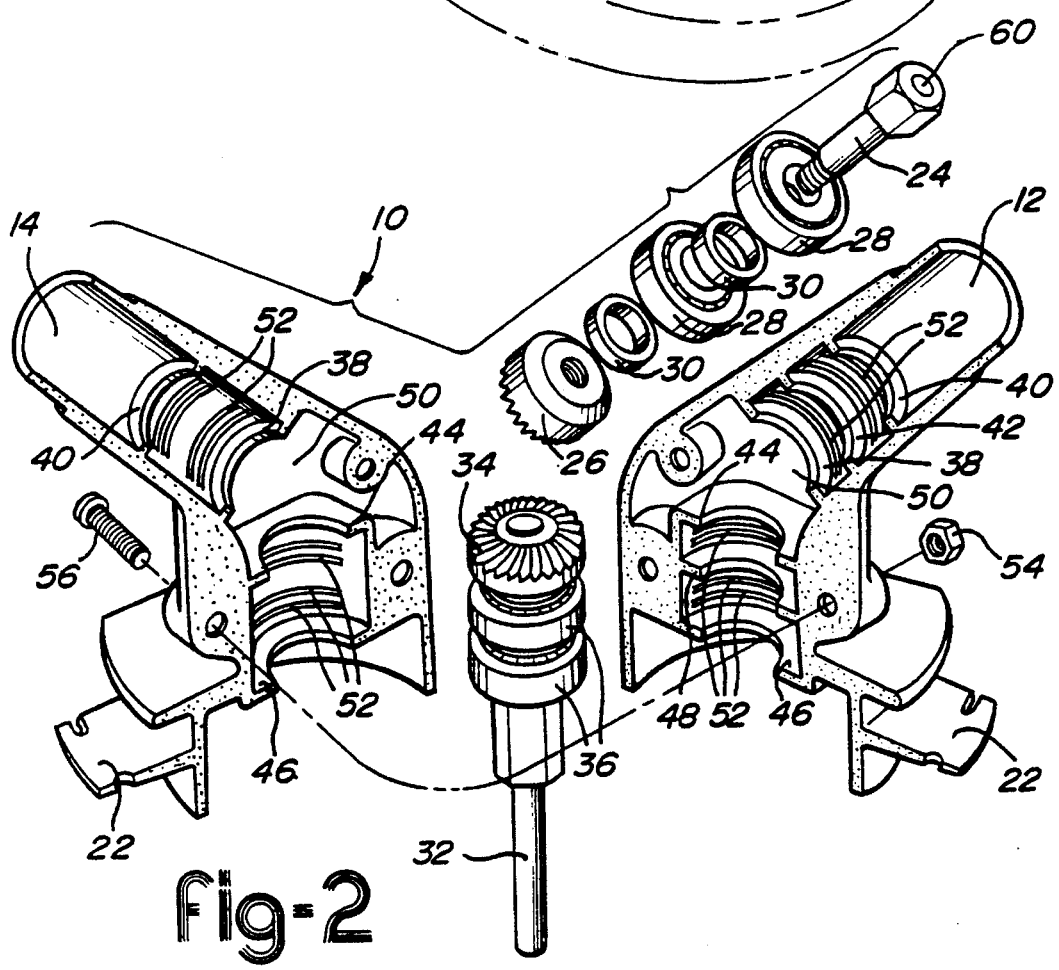
FIG. 2 is an exploded perspective view showing the angle gear drive of the present invention.

Referring now to FIG. 2, the angle drive 10 of the present invention is shown in exploded perspective view with the first and second housing portions 12 and 14 separated. An input shaft 24 is shown disassembled from a bevel gear 26 and sealed bearings 28. The input shaft 24 is assembled as a sub-assembly with the bevel gear 26 on one end and the sealed bearings 28 disposed along the input shaft 24. Spacers 30 separate the bearings 28 from each other and from the bevel gear 26. An output shaft 32 supporting a bevel gear 34 and two sealed bearings 36 is also illustrated.

An interior split annular rib 38 is provided on first and second housing portions 12 and 14. Similarly, an exterior split annular rib 40 is provided on first and second housing portions 12 and 14. An intermediate semi-annular rib 42 is provided between the interior and exterior split annular ribs 38 and 40 on the first housing portion 12. Intermediate semi-annular rib 42 and annular rib 38 fixes the axial position of input shaft 24 and assures proper alignment and operation of gears 26 and 34. The input shaft 24 is initially assembled to the first housing portion 12. The output shaft 32 is similarly mounted in the first housing portion 12 and is located by interior split annular rib 44 formed on the first housing portion 12 and the second housing portion 14. An exterior split annular rib 46 is likewise formed on first and second housing portions 12 and 14. Intermediate semi-annular rib 48 is provided on the first housing portion 12. Intermediate semi-annular rib 48 and annular rib 44 fixes the axial position of output shaft 32 and assures proper alignment and operation of gears 26 and 34.

When first and second housing portions 12 and 14 are assembled together, a gear cavity 50 is created in which the bevel gears 26 and 34 are enclosed. A series of ridges 52 are provided inside the first and second housing portions 12 and 14 to permit a tight crush-fit for retaining the bearings 28 and 36 when the housing portions 12 and 14 are secured together. First and second housing portions 12 and 14 are secured together by several nuts 54 and bolts 56, preferably a minimum of three sets of nuts 54 and bolts 56.

An axial lubrication bore 60 is preferably provided in the input shaft 24. The axial bore 60 extends through the length of the input shaft 24 along its axis. Lubrication is supplied through the axial bore 60 to fill the gear cavity 50.

Figure 3:
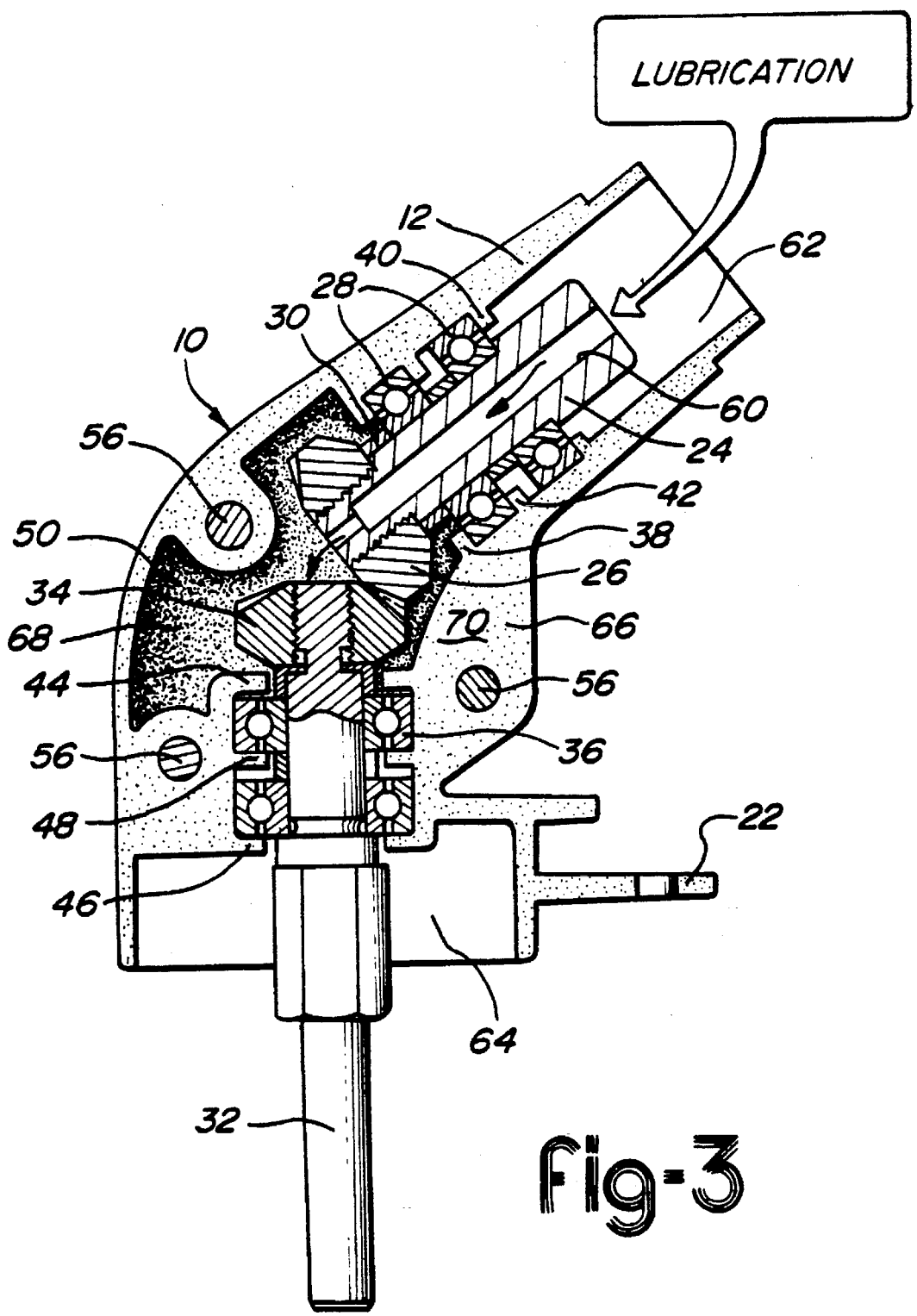
FIG. 3 is a cross-sectional view of the angle gear drive of the present invention.

Referring to FIG. 3, the internal construction of the angle drive 10 is shown. The input shaft 24 and output shaft 32 are shown assembled to the first housing portion 12. A boom receptacle 62 is formed at the upper end of the angle drive 10 and is adapted for receiving the boom. A tool receptacle sleeve 64 is formed on the lower end of the angle drive 10. A line trimmer spool (not shown) may be attached to the output shaft 32 and partially housed within the tool receptacle sleeve 64.

A sealant 66, shown by stippling in FIG. 3, is preferably provided on all the mating surfaces on the first housing portion 12 which is mated with the second housing portion 14. The sealant is preferably an anaerobic sealant or adhesive which forms a seal between the first and second housing portions 12 and 14. Grease 68, shown by stippling in FIG. 3, is injected into the gear cavity 50 through the axial lubrication bore 60 to lubricate the bevel gears 26 and 34.

Assembly of the angle gear drive will now be explained in detail with reference to FIGS. 2 and 3. The first and second housing portions 12 and 14 are preferably molded die cast aluminum parts but could be formed from alternative material which are cast to net size and shape. No machining is required to form the housing portions 12 and 14 except for the removal of any mold flash or surface imperfections.

The input shaft 24 is assembled with the bevel gear 26, bearings 28 and spacers 30, to form a sub-assembly. The sub-assembly is inserted into the first housing portion 12 with the interior split annular rib 38 between the bevel gear 26 and one of the bearings 28. The bearings 28 are inserted in the first housing portion 12 with one of the bearings being disposed between the interior split annular rib 38 and the intermediate semi-annular rib 42 and the other bearing being placed between the exterior split annular rib 40 and the intermediate semi-annular rib 42. In a similar manner, the output shaft 32 is assembled to the first housing portion 12 with the bevel gear 34 of the output shaft 32 being disposed in a meshed relationship with the bevel gear 26 of the input shaft 24 within the gear cavity 50. Bearings 36 are placed within the interior split annular rib 44 and exterior split annular rib 46 with the intermediate semi-annular rib 48 separating the bearings 36.

An anaerobic sealant 66 is applied to the mating surface 70 of the first housing portion 12. The first and second housing portions 12 and 14 are then fastened together with three nuts and bolts 54 and 56. Grease 68 is injected into the axial lubrication pore 60 to fill the gear cavity 50. It will be readily appreciated by one of ordinary skill in the art that the above description of a preferred embodiment of the invention may be modified and that it is intended to be an illustrative description. The broad scope of the Applicant's invention should be construed by reference to the following claims.

I claim:

1. A method of making an angle gear drive for a portable lawn implement comprising the steps of:

casting a pair of housing portions;

assembling an input gear shaft including a first gear and a first sealed bearing into one of said housing portions;

assembling an output gear shaft including a second gear and a second sealed bearing into one of said housing portions;

assembling together the pair of housing portions having the input and output gear shafts attached thereto to form an angle gear drive housing having a seam formed between the assembled pair of housing portions; and sealing the angle gear drive housing at the seam between said housing portions to form a sealed gear cavity within the angle gear drive wherein said casting step comprises casting one of said housing portions with a first set of semi-annular ribs which axially restrain said input gear shaft and said output gear shaft and casting said other housing portion with a second set of semi-annular ribs which axially restrain said input gear shaft and said output gear shaft, said second set of semi-annular ribs including at least two ribs which correspond to the semi-annular ribs of said first set of said semi-annular ribs.

2. The method of claim 1 wherein said sealing step comprises applying an anaerobic sealant to the seam between the housing portions.

3. The method of claim 2 further comprising the step of supplying grease to the sealed gear cavity.

4. The method of claim 3 wherein said supplying step comprises injecting grease into a coaxial bore formed in said input gear shaft.

5. The method of claim 4 wherein said casting step comprises molding said housing portions to net shape.

* * * * *